United States Patent [19]

Gaccetta et al.

[11] Patent Number: 5,685,227
[45] Date of Patent: Nov. 11, 1997

[54] BRAKE ASSEMBLY FOR OVERHEAD TROLLEY

[75] Inventors: Joseph M. Gaccetta, Riverside; Karl S. Schroeder, Clayton, both of Ohio

[73] Assignee: Premark FEG L.L.C., Wilmington, Del.

[21] Appl. No.: 529,504

[22] Filed: Sep. 18, 1995

[51] Int. Cl.⁶ .................................................. B61B 3/00
[52] U.S. Cl. .............................. 105/150; 188/36; 188/42; 104/250
[58] Field of Search ........................... 105/148, 150; 104/89, 93, 250; 188/42, 29, 36; 16/87.4 R, 90; 267/158, 160, 164

[56] References Cited

U.S. PATENT DOCUMENTS

| | | | |
|---|---|---|---|
| 833,844 | 10/1906 | McKay | 188/36 |
| 1,471,657 | 10/1923 | Hampton | 188/42 |
| 2,148,515 | 2/1939 | Taylor | 188/42 |
| 2,834,435 | 8/1958 | Vanderbeck | 188/42 |
| 3,936,906 | 2/1976 | Takazawa | 188/42 |
| 4,519,591 | 5/1985 | Bush | 267/148 |

FOREIGN PATENT DOCUMENTS 1008220  10/1996  United Kingdom ............... 188/42

*Primary Examiner*—Robert J. Oberleitner
*Assistant Examiner*—C. T. Bartz
*Attorney, Agent, or Firm*—Thompson Hine & Flory LLP

[57] ABSTRACT

The present invention relates to a brake assembly, for overhead conveyers of the type which are suspended from and move along a rail and more particularly, a leaf spring brake or wedge assembly for an overhead trolley which wedges two pairs of wheels in a track for a secure braking system to stabilize the suspended system against movement.

18 Claims, 4 Drawing Sheets

BRAKE ASSEMBLY FOR OVERHEAD TROLLEY

BACKGROUND OF THE INVENTION

The present invention relates to a brake assembly, for overhead conveyors of the type which are suspended from and move along a rail and more particularly, a leaf spring brake or wedge assembly for an overhead trolley which wedges two pairs of wheels in a track for a secure braking system to stabilize the suspended system against movement.

Typically, overhead trolleys are used which run in a beam or track suspended overhead from the ceiling. The trolleys can be used to transport anything from curtains to heavy machinery such as hoists, or weighing scales from one location to another which is connected by the track. The wheels of the trolley run freely in the track. When the machinery is transported to the appropriate location, it is stopped typically by a braking system. An example of such a braking system is disclosed in U.S. Pat. No. 2,834,435 to Vanderbeck or U.S. Pat. No. 3,936,906 to Takazawa. Both of these systems brake by using brake pads or frictionally abutting a spring-loaded stopper on the rail.

Another prior art method of braking is to provide a pin on the trolley and a plurality of holes spaced along the track. The pin on the trolley can be inserted in the hole on the track for braking. However, with this system, it is difficult to align the pins in the holes and the user does not have complete control of where the trolley can be stopped.

Another disadvantage of such prior art systems, is that there is a substantial amount of play in the trolley when it is braked. This arises due the fact that there must be clearance between the wheels of the trolley and the beam in order for the trolley to roll on the track. This clearance results in play which in turn, means that the equipment hanging from the trolley tends to swing easily. The play renders the equipment unsteady and therefore, it is difficult to get an accurate reading or precise action from the machinery.

Also, swinging becomes a further problem due to the momentum and the weight which accompanies the carrying cables and chains of a hoist or other apparatus on the trolley.

Accordingly, there is a need for a secure braking system which reduces the play and/or swinging in the trolley. Further, there is a need for a system which is simple in construction and will hold the device securely in any desired fixed position while remaining under the control of the operator.

SUMMARY OF THE INVENTION

The present invention is a brake assembly for an overhead trolley. In a preferred embodiment of the invention, the trolley assembly comprises a trolley having at least one pair of wheels, the wheels being laterally spaced apart; a track having a lower flange and an upper surface such that the wheels of the trolley ride along the track between the upper surface and the lower flange; a space between the wheels and the upper surface; a stop in the form of a leaf spring or wedge system having a thickness greater than the space and being deployable between an extended and a retracted position, wherein the stop is in braking engagement with a wheel and an upper surface or the lower flange when the stop is in the extended position and the stop is displaced from braking engagement and the trolley is freely movable along the track when the stop is retracted; the stop being spring biased into braking engagement; and means for retracting the stop from the braking engagement.

Accordingly, it is an object of the present invention to provide a brake assembly for an overhead trolley which provides a secure brake for trolley; a system in which play and movement of the stopped trolley is minimized; a system which is relatively easy to construct and utilize; and a system which is easy to maintain.

Other objects and advantages of the present invention will be apparent from the following description, the accompanying drawings and the appended claims.

DETAILED DESCRIPTION

Figure 1:
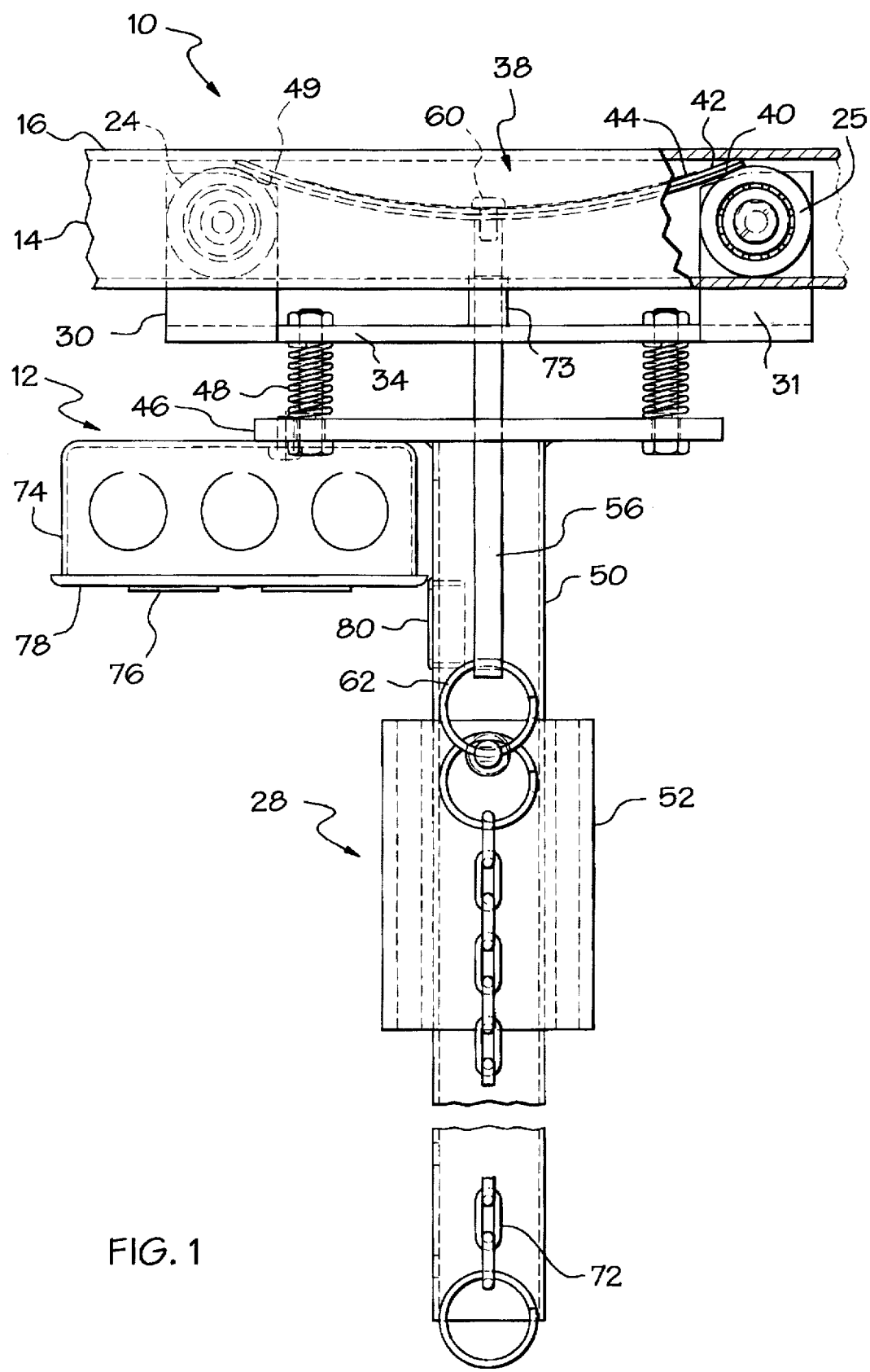
FIG. 1 is a side elevational view, of the brake assembly for an overhead trolley of the present invention.
Figure 2:
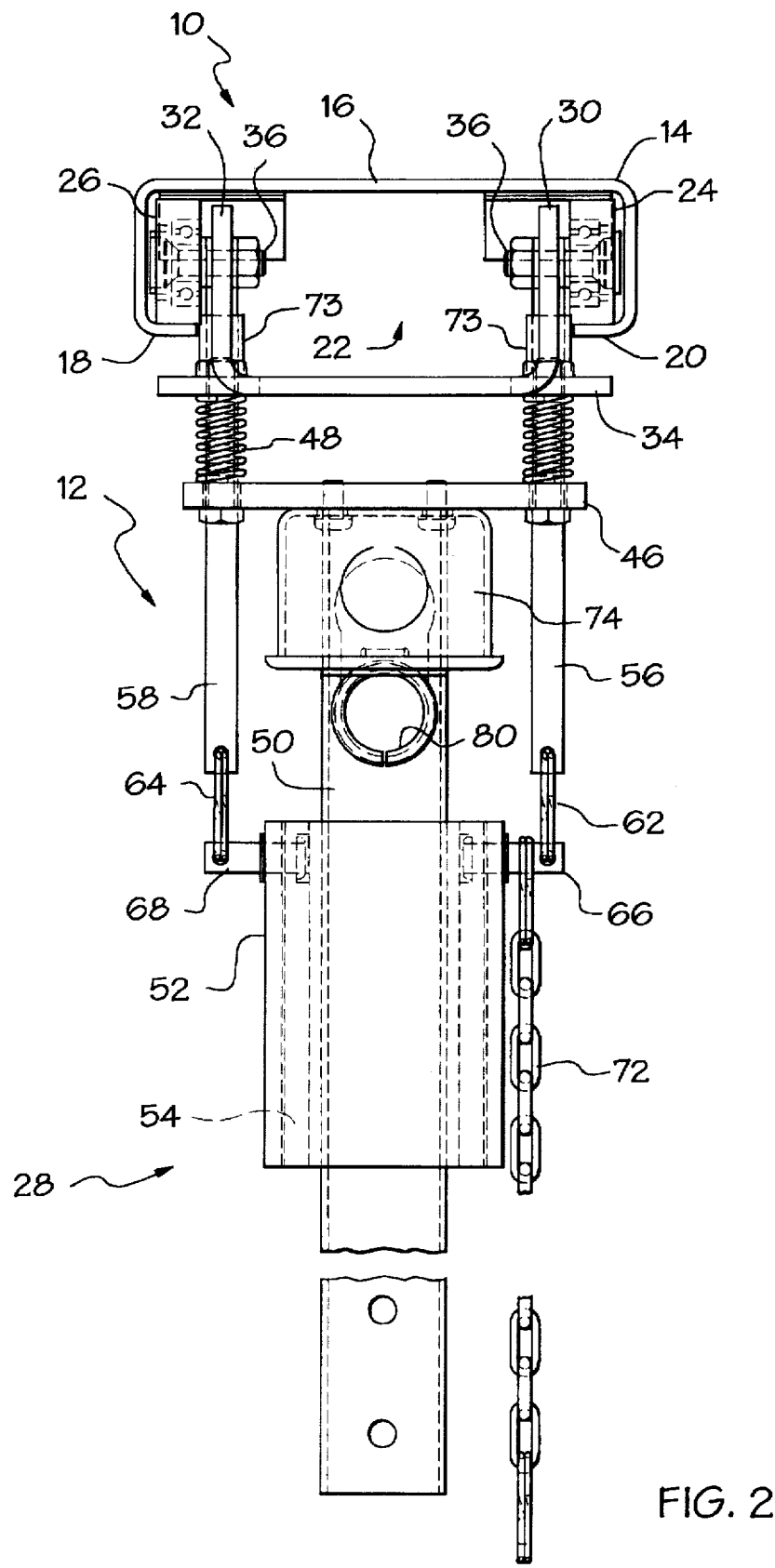
FIG. 2 is left side elevational view of the system of FIG. 1.

FIGS. 1 and 2 show an overhead trolley apparatus generally designated 10 having a brake assembly of the present invention. The apparatus 10 includes a trolley 12 movably received within a track 14. The track 14 preferably has a C-shaped cross-section as shown in FIG. 2, having an upper surface 16, a pair of lower flanges 18,20 and a downward opening 22. The track is supported overhead in any suitable manner as will be apparent to those of skill in the art, and extends the length of the desired location wherein the trolley-carried equipment (not shown) is to be used. Further, the track 14 is preferably formed of a single piece of material, as joints will cause the trolley to ride unevenly within the track.

The trolley 12 includes two pairs of wheels 24,25 and 26, 27(not shown) shaped to be received between the upper surface 16 and lower flanges 18,20 of the C-shaped track 14 and ride easily and smoothly therein. The wheels may contain ball bearings for easier rotation. The trolley 12 includes four side plates 30,31,32, and 33 (not shown) and a trolley plate 34 which are fixedly attached to one another or may be integrally formed. The axle 36 for each wheel is supported by its respective side plate.

The trolley 12 includes two leaf spring brake assemblies 38, one for each pair of wheels 24,25 and 26,27. Each leaf spring should have a length such that it extends fully between the two wheels 24,25 or 26,27 and a total thickness such that it is larger than the space between the underside of top surface 16 of the track and the top portion of the respective wheel. The thickness of the leaf spring brake 38 is dependent upon the diameter of the wheels 24 and the height of the opening of the track 14. However, the leaf spring brake assembly 38 must be thick enough to continue to wedge with small deviations in the gap between the rail 14 and the top portion of the wheels. Both leaf springs are shaped the same for a symmetrical system. Further, as an alternative, the leaf spring may be between the wheels and the bottom flange.

The leaf spring brakes each comprise a plurality of rectangular leaves. Preferably, two 1/16 inch thick (1.59 mm) plastic leaves 40,42 are used. It is preferable to use two thin leaves rather than one thick leaf as less force is required to bend two thinner leaves than one thicker leaf. Further, by using a plurality of leaves, the deflection of the leaf spring is improved. The leaf spring assembly further includes a thin stainless steel leaf 44 on top of the plastic leaves 40,42. This metal leaf 44 supports and guides the plastic leaves and prevents them from becoming over-stressed and/or failing or breaking. The leaf spring assembly further has a through hole centrally located therein for attachment of a braking control 72 as will be described hereinbelow.

Preferably, the inside corners of the side plates 30–34 are bevelled which act as pivot points as shown by 49 in plate 30. As the chain is pulled to de-activate the brake, the pivot causes the end of the leaf spring to come out of contact with the wheel to prevent drag.

The assembly 10 further includes a lower portion 28 connected to the trolley 12 and which extends downwardly through the opening 22 in the C-shaped track 14. The lower portion 28 is designed to carry the equipment such as a weighing scale and also includes a control mechanism 72 for moving the apparatus and actuating the brake. The lower portion 28 of the trolley includes a lower plate 46 and four springs 48 to connect the lower plate 46 of the lower portion of the trolley to the trolley plate 34 of the trolley. The springs 48 are provided to reduce the impact force exerted on the trolley 12 if the user should exert excessive force on the lower portion of the trolley, or should attempt to move, or bump into the apparatus without releasing the brake.

A tube 50 is attached to the lower plate 46 of the lower portion 28 of the trolley for supporting the equipment, and a brake release sleeve 52 is slidably received over the tube. An inner bushing 54 is provided to lower the friction between the sleeve 52 and the tube 50.

The lower portion, includes two rods 56,58 extending through the centrally located hole in each of the leaf springs 38 through the opening 22 in the track to the lower portion of the trolley 28. A screw 60 holds the leaf spring brakes on each rod. The rods 56,58 are connected via rings 62,64 to the brake release guide 52. Two brake release pins 66,68 extend through the brake release guide and the bushing 54, and are connected by the rings 62,64 to the rods 56,58. A brake chain 72 is attached to the brake release pin 66.

The trolley 12 further includes a plastic limiter sleeve 73a,73b on each rod 56,58 between the brake 38 and the trolley plate 34. This sleeve 73a,73b acts as a stop to prevent the leaf spring from becoming overbent.

To provide electricity to the equipment, a junction box 74 can be attached to the lower plate 46 of the trolley. The junction box includes a plurality of outlets 76 and a cover plate 78. A hole 80 in the tube 50 allows an electrical cord to be fed through the trolley to the junction box.

The method of using the above-described trolley will now be described in accordance with the present invention. The user pulls down on the chain 72. This pulls the pins 66,68 which extend the rods 56,58, retracting the leaf spring brake 38 and deforming it downwardly. This allows the wheels 24–27 to rotate freely in the track 14 and the trolley 12 will move in the track as directed by the user. When the user releases the chain 72, the leaf springs 38 straighten out and each end of each spring becomes wedged between a wheel 24,25 or 26,27 and the underside of the upper surface 16 of the track. Thus, when the user desires to move the equipment, they simply grasp the chain 72 and pull the trolley to the desired location. When the equipment is in the desired location, the user releases the chain and the trolley automatically brakes by action of the leaf springs. This increases the stability and eliminates any play. Thereby a stable brake is formed.

Figure 3:
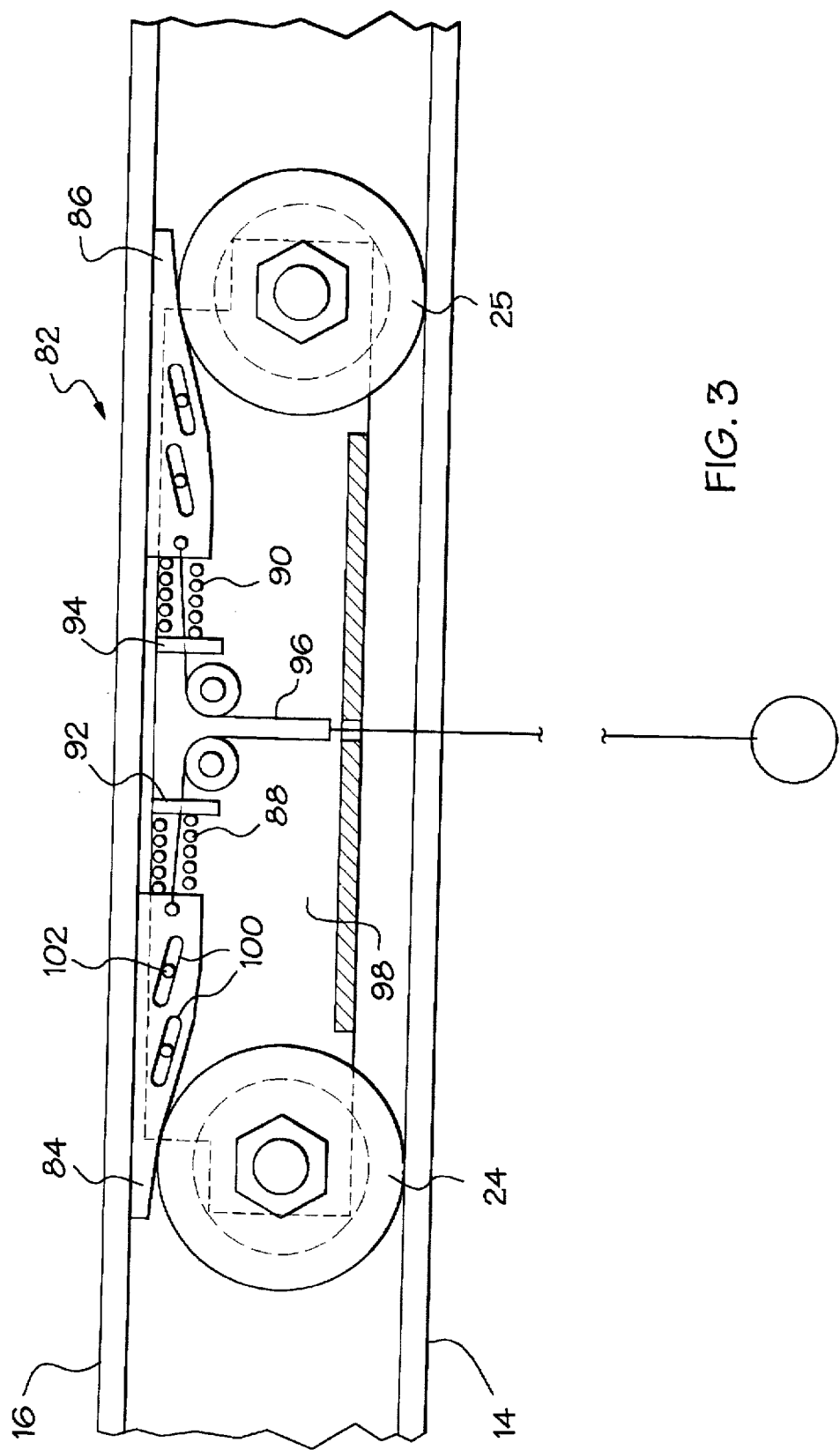
FIG. 3 is a side elevational view of an alternative brake assembly for an overhead trolley of the present invention.
Figure 4:
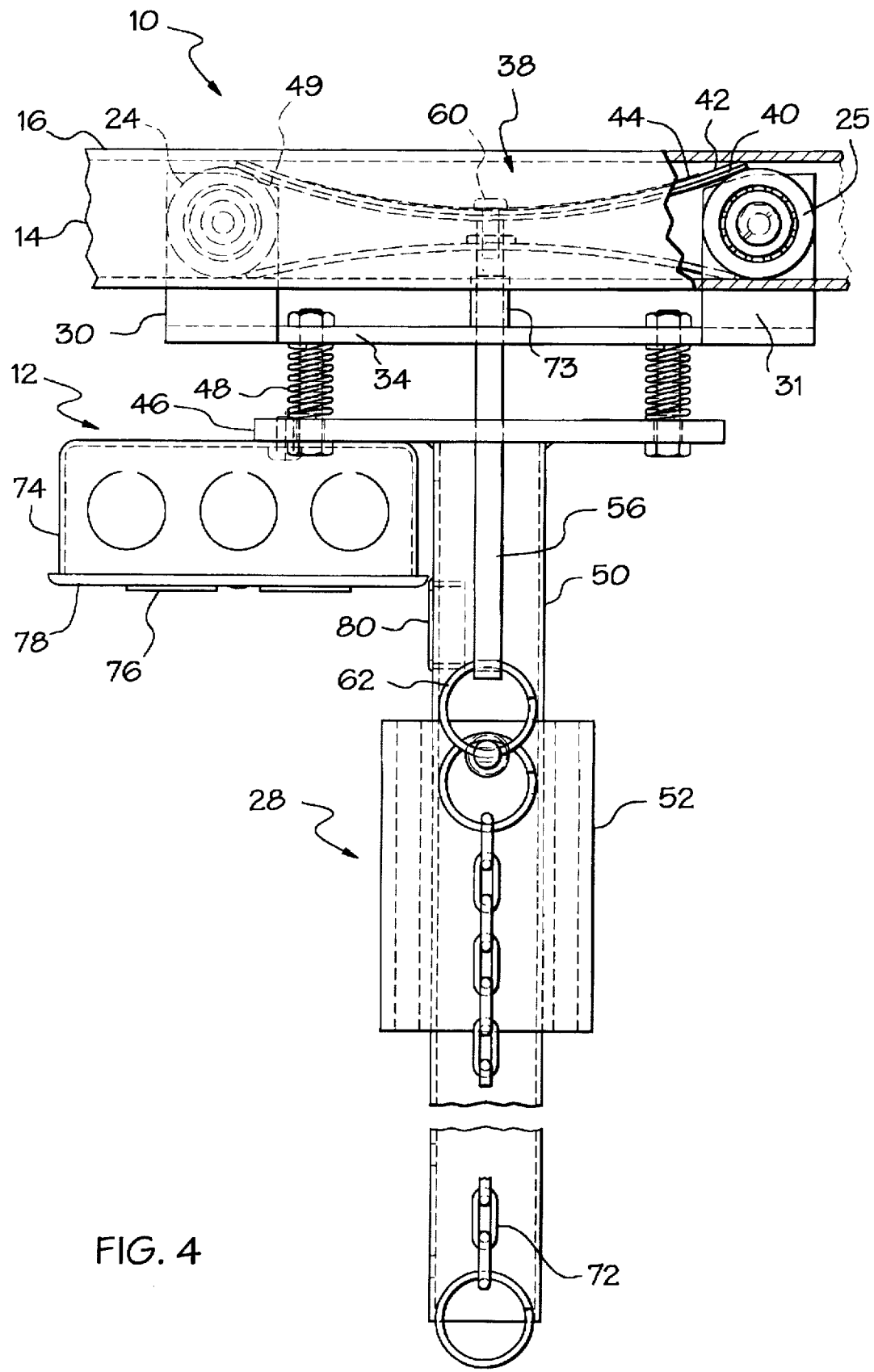
FIG. 4 is a side elevational view, of the brake assembly for an overhead trolley of the present invention with alternative structure as recited in claim 1.

As an alternative embodiment of the present invention, in place of the leaf spring, a wedge system 82 brake may be used for the stop as shown in FIG. 3. Two wedges 84,86 are shaped such that they each have a thickness larger than the space between the underside of top surface 16 of the track and the upper portion of the respective wheel. Each wedge is connected to a spring 88,90 and held in place by a stop 92,94. These springs may be compression or extension springs and are designed to allow spring-loaded movement to the wedges. The wedge brake 82 is then deployable between an extended position wherein the wedges are in braking engagement with the wheels as shown, and a retracted position wherein the wedges are displaced from braking engagement with the wheels. In this position, the springs 88,90 are compressed so that the wedges 84,86 move toward each other allowing the wheels to rotate freely.

The springs 88,90 are attached to a retracting means or chain 96 so that pulling down on the chain deactivates the wedge brake 82. The wedges are connected to the trolley assembly 12 by side plates 98. These side plates are similar to those shown in FIGS. 1–2 for supporting the wheel axles. Further, the side plates include a set of inclined slots 100 for slidably receiving extension tabs 102 formed integrally on the wedges 84,86. When the wedges are displaced from braking engagement by action of the retracting means 96, the tabs 102 slide downwardly and inwardly in the inclined slots, compressing the springs 88,90 which allows the trolley to move freely in the track.

Having described the invention in detail and by reference to preferred embodiments thereof, it will be apparent that modifications and variations are possible without departing from the scope of the invention defined in the appended claims.

What is claimed is:

1. A trolley assembly comprising:

a trolley having at least one pair of wheels, said wheels being laterally spaced apart;

a track having a lower flange and an upper surface such that said wheels of said trolley ride along the track between said upper surface and said lower flange;

a space between said wheels and said upper surface;

a wedging member spring-biased in a direction parallel to said track and having a thickness greater than said space and being deployable between an extended and a retracted position, wherein said wedging member is in braking engagement with said wheel and said upper surface or said lower flange when said wedging member is in said extended position and said wedging member is displaced from braking engagement and said trolley is freely movable along said track when said wedging member is retracted; and means for retracting said wedging member from said braking engagement, such that when said retracting means is pulled, said wheels rotate freely and when said retracting means is released, said trolley automatically brakes such that said trolley may be maneuvered in said track by pulling said retracting means.

2. The assembly of claim 1 wherein said wedging member is a leaf spring.

3. The assembly of claim 2 wherein said leaf spring is a laminate comprising a plurality of plastic leaves and a metallic leaf superposed on said plastic leaves for supporting said leaf spring and preventing said leaf spring from becoming overstressed.

4. The assembly of claim 2 wherein said trolley includes four spaced wheels, a pair of laterally-spaced wheels on each side of said trolley; and two leaf springs such that each leaf spring is applied to a pair of laterally-spaced wheels.

5. The assembly of claim 1 wherein said track is C-shaped having a downward opening.

6. The assembly of claim 3 wherein said leaf spring has a hole therein and said retracting means is connected to said leaf spring by a rod which extends through said hole.

7. The assembly of claim 6 further including a limiter sleeve on said rod, such that said sleeve acts as a stop to prevent over-bending of said leaf spring.

8. The assembly of claim 1 wherein the trolley includes a compression spring which urges said wedging member into said braking engagement.

9. The assembly of claim 8 wherein said wedging member includes a pair of wedge segments connected to a pair of said compression springs such that a single wedge segment is capable of achieving braking engagement with a single wheel.

10. The assembly of claim 1 wherein said trolley supports a weighing scale.

11. A trolley/assembly comprising:
- a trolley having two pairs of wheels, each of said pairs being laterally spaced apart;
- a track having a lower flange and an upper surface such that said wheels of said trolley ride along the track between said upper surface and said lower flange;
- a space between said wheels and said upper surface; and
- a pair of leaf springs each having a thickness greater than said space and being deformable between an extended and a retracted position, wherein said leaf springs are in braking engagement with said pairs of said wheels and said underside of said upper surface of said track when said leaf springs are in said extended position and leaf springs are displaced from braking engagement and said trolley is freely movable along said track when said springs are in a retracted position; and
- means for retracting said leaf springs such that pulling said retracting means deforms said spring and unwedges said wheels so that they rotate freely in said track.

12. The assembly of claim 11 wherein said track is C-shaped having a downward opening.

13. The assembly of claim 11 wherein said trolley supports a weighing scale.

14. The assembly of claim 11 wherein said leaf springs each have a hole therein and said retracting means is connected to said leaf spring by rods which extends through said holes.

15. The assembly of claim 14 further including a limiter sleeve on said rod, such that said sleeve acts as a stop to prevent over-bending of said leaf spring.

16. The assembly of claim 11 wherein when said retracting means is pulled, said wheels rotate freely and when said retracting means is released, said trolley automatically brakes such that the trolley may be maneuvered in said track by pulling said retracting means.

17. A trolley assembly comprising:
- a trolley having four wheels;
- a track having a lower flange and an upper surface such that said wheels of said trolley ride along the track between said upper surface and said lower flange;
- a space between said wheels and said upper surface; and
- a pair of wedge brakes being deployable between an extended and a retracted position, wherein said wedge brakes each include a compression spring having a pair of wedge segments connected to said compression spring such that said compression spring urges said wedge into a braking engagement between said wheel and said underside of said upper surface when said wedge brakes are displaced from braking engagement and are freely movable along said track when said wedge brakes are in a retracted position, and
- means for retracting said compression springs, such that when said retracting means is pulled, said wedge brakes are retracted and said wheels rotate freely.

18. The assembly of claim 1 wherein said spring-biased wedge member extends between said pair of wheels such that a first end of said wedge member is biased between one wheel and said upper surface or said lower flange, and a second end of said wedge member is biased between a different wheel and said upper surface or said lower flange.

* * * * *